J. C. COLE.
RIM CONSTRUCTION.
APPLICATION FILED MAR. 25, 1912.
1,068,041.
Patented July 22, 1913.
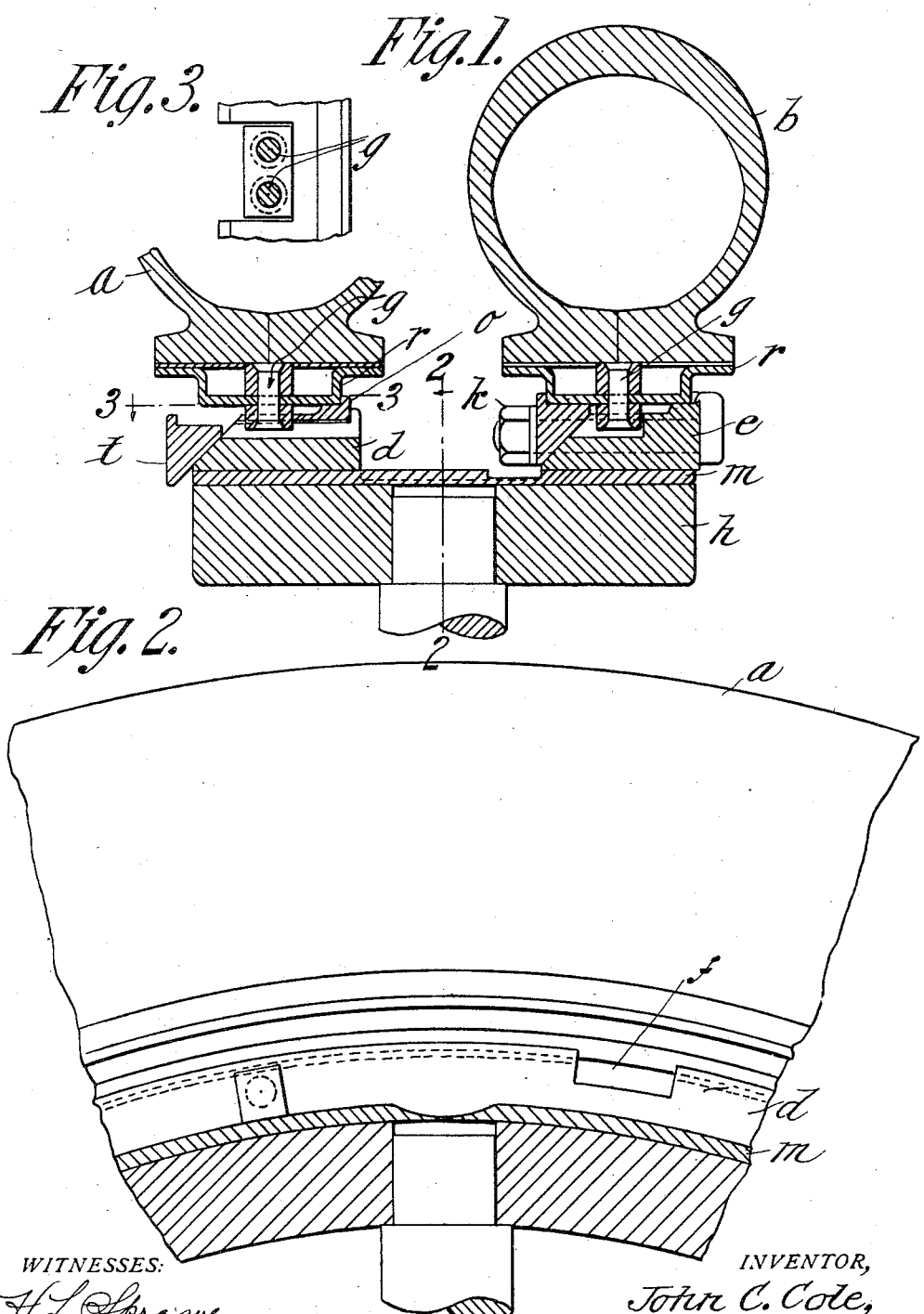
WITNESSES:
H. L. Sprague
R. M. Mowry.
INVENTOR,
John C. Cole,
BY
Chapin & Co
ATTORNEY.

UNITED STATES PATENT OFFICE.

JOHN CLARENCE COLE, OF CHICOPEE FALLS, MASSACHUSETTS, ASSIGNOR TO FISK RUBBER COMPANY, OF CHICOPEE FALLS, MASSACHUSETTS, A CORPORATION OF DELAWARE.

RIM CONSTRUCTION.

1,068,041. Specification of Letters Patent. Patented July 22, 1913.

Application filed March 25, 1912. Serial No. 686,004.

*To all whom it may concern:*

Be it known that I, JOHN CLARENCE COLE, a citizen of the United States of America, residing at Chicopee Falls, in the county of Hampden and State of Massachusetts, have invented new and useful Improvements in Rim Construction, of which the following is a specification.

This invention relates to that class of apparatus designed to facilitate the handling of tires as the latter are placed on or taken off the wheel of a vehicle.

Specifically it relates to a dual tire-holding construction, viz.,—one in which the felly of the wheel carries two fixed rims, each one of which receives a removable rim and tire.

The construction is particularly adapted for use with trucks, although not confined thereto.

The object of the invention is to provide means whereby the removable rim with its tire which is next to the body of the vehicle can be removed easily and conveniently.

Other objects of the invention will be brought out in the detailed description and annexed claims.

In the drawings forming part of this application,—Figure 1 is an axial cross sectional view of the invention. Fig. 2 is a cross sectional view on the line 2—2, Fig. 1. Fig. 3 is a plan view of a detail of construction taken on the line 3—3 of Fig. 1.

Referring to the drawings, the felly $h$ has a plate $m$ fastened thereon which, in turn, has two rims $d$ and $e$ fixed thereto. The plate $m$ could be dispensed with, but is used for convenience. The fixed rim $e$ is slightly larger in diameter than the fixed rim $d$ which step-up arrangement permits the removable rim $r$ (larger in diameter than either the rims $d$ or $e$ and carrying the tire $b$) to pass over the fixed rim $d$ and onto the fixed rim $e$. Any suitable fastening device, such as $k$, comprising flanged bolts and beveled expanding rings, is used to bind the removable rim to the fixed rim, as shown. After the removable rim is fixed on the rim $e$, a blocking ring $o$ is slipped on the fixed rim $d$ which has a flange to receive and position the same. The diameter of the fixed rim $d$ with the blocking ring $o$ added thereto, is equal to that of the rim $e$. The removable rim $r$ carrying the tire $a$ which has the same diameter as the other removable rim, is placed on the blocking ring $o$ which has a flange to position it and a holding device $t$, similar to the device $k$, to hold it to said blocking ring. Each removable rim has one or more positioning blocks $g$ fast thereto which fit in corresponding recesses in the rim $e$ or in the blocking ring $o$. Before the blocking ring is put in place, the block or blocks $g$ of the inner rim $r$ pass through corresponding slots $f$ in the rim $d$. In addition to positioning the removable rims on the fixed rims by the blocks $g$ and recesses, as stated, said blocks fitting in the recesses prevent any relative circular movement of the removable rim with respect to the fixed rim, which is important in devices of this character.

When the parts have been all assembled, as indicated above, and it is desired to remove both tires from the wheel, they can be removed from the most convenient side, that is the side away from the body of the vehicle, without removing the wheel from its axle. This is done as follows: Referring to Fig. 1, the holding device $t$ is lowered to the position shown, the tire $a$ with its rim is slipped off the blocking ring $o$, the latter is removed from the fixed rim $d$, and inasmuch as the latter is of smaller diameter than either rim $r$, the tire $b$ can be slipped thereover with its rim $r$ which gives the desired result. In this last operation the blocks $g$ pass through slots $f$ provided for that purpose in the rim $d$.

Applicant has described his invention specifically as applied in the details shown. The invention, can, however, be applied in other specific forms.

What I claim, is:—

1. In combination, a felly, two fixed rims attached thereto, one smaller in diameter than the other, a blocking ring of the same diameter as the larger rim arranged to fit over the rim of the smaller diameter, two removable rims of the same diameter, one arranged to fit on the fixed rim of the larger diameter and the other arranged to fit on the blocking ring-holding devices to bind the removable rim to the larger fixed rim, together with other holding devices to bind the smaller fixed rim, blocking ring and the other removable rim together, all for the purpose described.

2. In combination, a felly, two fixed rims attached thereto, one of larger diameter than the other, a blocking ring of the same diameter as the larger rim arranged to fit on the smaller rim which has a flange to position it, two removable rims of equal diameter either one of which is insertible over the smaller rim when the blocking ring is not mounted thereon to take its place on the larger rim, and the remaining removable rim being adapted to fit on the blocking ring, fastening means to bind said smaller rim, blocking ring, and one removable rim together, and other fastening means to bind the other removable rim and larger rim together, all for the purpose described.

3. In combination, a felly, two fixed rims attached thereto, one of larger diameter than the other, two removable rims of equal diameter either one of which is adapted to pass over the smaller fixed rim and fit on the larger fixed rim for attachment thereto, and means to make such attachment, removable means adapted to fit on said smaller fixed rim to build a bearing surface on it to a diameter equal to the larger fixed rim, whereby after one removable rim has passed over the smaller rim for attachment to the larger rim, said removable means may be fitted in place and the remaining removable rim may be placed thereon for attachment thereto, and means to make such attachment.

4. In combination, a felly, two fixed rims attached thereto, one of larger diameter than the other (the fixed rim of smaller diameter having on its circumference axial slots) two removable rims of equal diameter either one of which is adapted to pass over the smaller fixed rim and fit on the larger rim for attachment thereto, and means to make such attachment, devices on each removable rim to fit into recesses in the fixed rim for preventing relative circular motion therebetween, removable means adapted to fit on said smaller fixed rim to build a bearing surface on it to a diameter equal to the larger fixed rim, whereby after one removable rim has passed over the smaller rim for attachment to the larger rim, said removable means can be fitted in place and the remaining removable rim can be placed thereon for attachment thereto, and means to make such attachment.

JOHN CLARENCE COLE.

Witnesses:
 Franklin G. Neal,
 Harry W. Bowen.